US006114664A

United States Patent [19]

Cook et al.

[11] Patent Number: 6,114,664

[45] Date of Patent: Sep. 5, 2000

[54] OVEN WITH COMBINED CONVECTION AND LOW MASS, HIGH POWER DENSITY HEATING

[75] Inventors: Edward R. Cook; Joseph R. Adamski, both of Cedar Rapids, Iowa

[73] Assignee: Amana Company, L.P., Amana, Iowa

[21] Appl. No.: 09/111,640

[22] Filed: Jul. 8, 1998

[51] Int. Cl.[7] .............................. A21B 1/22; A21B 1/26; F24C 15/04; F24C 15/32

[52] U.S. Cl. .......................... 219/400; 219/411; 219/413; 126/21 A; 126/190

[58] Field of Search .................................... 219/400, 405, 219/411–413; 126/21 A, 21 R, 273 R, 190, 400; 392/416, 418, 375–378

[56] References Cited

U.S. PATENT DOCUMENTS

| | | | |
|---|---|---|---|
| 3,313,917 | 4/1967 | Ditzler et al. | 219/400 |
| 3,612,825 | 10/1971 | Chase et al. | 219/405 |
| 3,820,525 | 6/1974 | Pond | 126/21 A |
| 3,862,397 | 1/1975 | Anderson et al. | 219/405 |
| 4,051,347 | 9/1977 | Rohrl et al. | 219/400 |
| 4,374,319 | 2/1983 | Guibert | 219/400 |
| 4,455,479 | 6/1984 | Itoh et al. | 219/405 |
| 4,486,639 | 12/1984 | Mittelsteadt | 392/416 |
| 4,508,960 | 4/1985 | Arai | 219/388 |
| 4,550,245 | 10/1985 | Arai et al. | 219/405 |
| 4,728,777 | 3/1988 | Tsisios et al. | 392/418 |
| 4,870,255 | 9/1989 | Fujii et al. | 219/400 |
| 4,951,652 | 8/1990 | Ferrario et al. | 126/200 |
| 5,036,179 | 7/1991 | Westerberg et al. | 219/411 |
| 5,045,671 | 9/1991 | Kanaya et al. | 219/411 |
| 5,340,089 | 8/1994 | Heath et al. | 392/416 |
| 5,382,441 | 1/1995 | Lentz et al. | 426/241 |
| 5,404,420 | 4/1995 | Song | 392/416 |
| 5,517,005 | 5/1996 | Westerberg et al. | 219/405 |
| 5,676,870 | 10/1997 | Wassman et al. | 219/400 |
| 5,695,668 | 12/1997 | Boddy . | |
| 5,721,805 | 2/1998 | Cook et al. . | |
| 5,736,713 | 4/1998 | Westerberg . | |
| 5,786,568 | 7/1998 | McKinney | 219/400 |
| 5,801,362 | 9/1998 | Pearlman et al. | 219/400 |
| 5,883,362 | 3/1999 | Pettibone et al. | 219/411 |
| 5,990,452 | 11/1999 | Shelton | 219/393 |

*Primary Examiner*—Joseph Pelham
*Attorney, Agent, or Firm*—Tobor, Goldstein & Healey, L.L.P.

[57] ABSTRACT

An oven comprises a cooking chamber, first and second energy sources, a cooling fan, and a controller. The first energy source provides radiation heating in the cooking chamber, and the first energy source has a low mass for rapid heating. The second energy source provides convection heating in the cooking chamber, and the second energy source has a high mass heating element and a convection fan for moving air through the cooking chamber during convection heating. The cooling fan moves cooling air over the first energy source. The controller energizes the first and second energy sources during at least initial convection heating so that the first energy source rapidly heats the cooking chamber in order to facilitate the initial convection heating and to eliminate the need to pre-heat the cooking chamber.

30 Claims, 3 Drawing Sheets

OVEN WITH COMBINED CONVECTION AND LOW MASS, HIGH POWER DENSITY HEATING

TECHNICAL FIELD OF THE INVENTION

The present invention relates to an oven that combines both convection heating and heating with low mass, high power density elements.

BACKGROUND OF THE INVENTION

Ovens supplied by oven manufacturers have traditionally implemented three basic cooking technologies. These cooking technologies are convection cooking, microwave cooking, and cooking with high mass, low power density radiative heating elements such as electric resistance coils. These cooking technologies have proven to be adequate, but all exhibit compromises between cooking speed and cooking quality. In attempts to achieve both faster cooking speed and higher cooking quality, various ones of these cooking technologies, such as convection cooking and microwave cooking, have been combined. However, such combinations have not proven to be particularly effective in achieving both higher quality cooking and faster cooking speeds.

The present invention is directed to an oven that achieves both higher cooking quality and faster cooking speeds.

SUMMARY OF THE INVENTION

In accordance with one aspect of the present invention, an oven comprises a cooking chamber and first and second energy sources. The first energy source is arranged to provide radiation heating in the cooking chamber, and comprises a low mass, high power density heating element. The second energy source is arranged to provide convection heating in the cooking chamber.

In accordance with another aspect of the present invention, an oven comprises a cooking chamber, first and second energy sources, and a controller. The first energy source is arranged to provide radiation heating in the cooking chamber, and the first energy source includes a low mass, high power density heating element for providing rapid heating. The second energy source is arranged to provide convection heating in the cooking chamber, and the second energy source has a high mass heating element and a convection fan arranged to move air through the high mass heating element and the cooking chamber during convection heating. The controller is arranged to energize the first and second energy sources during at least initial convection heating so that the first energy source rapidly heats the cooking chamber.

In accordance with yet another aspect of the present invention, an oven comprises a cooking chamber, a radiation heating source, a convection heating source, and a cooling fan. The radiation heating source includes a low mass, high power density heating element arranged to provide high power density rapid heating in the cooking chamber. The convection heating source is arranged to provide convection heating in the cooking chamber, and the convection heating source includes a convection fan arranged to move air through the cooking chamber during convection heating. The cooling fan is arranged to cool the radiation heating source.

In accordance with yet another aspect of the present invention, an oven comprises a cooking chamber, first means for providing rapid heating of the cooking chamber, second means for providing convection heating of the cooking chamber, and third means for cooling the first means.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
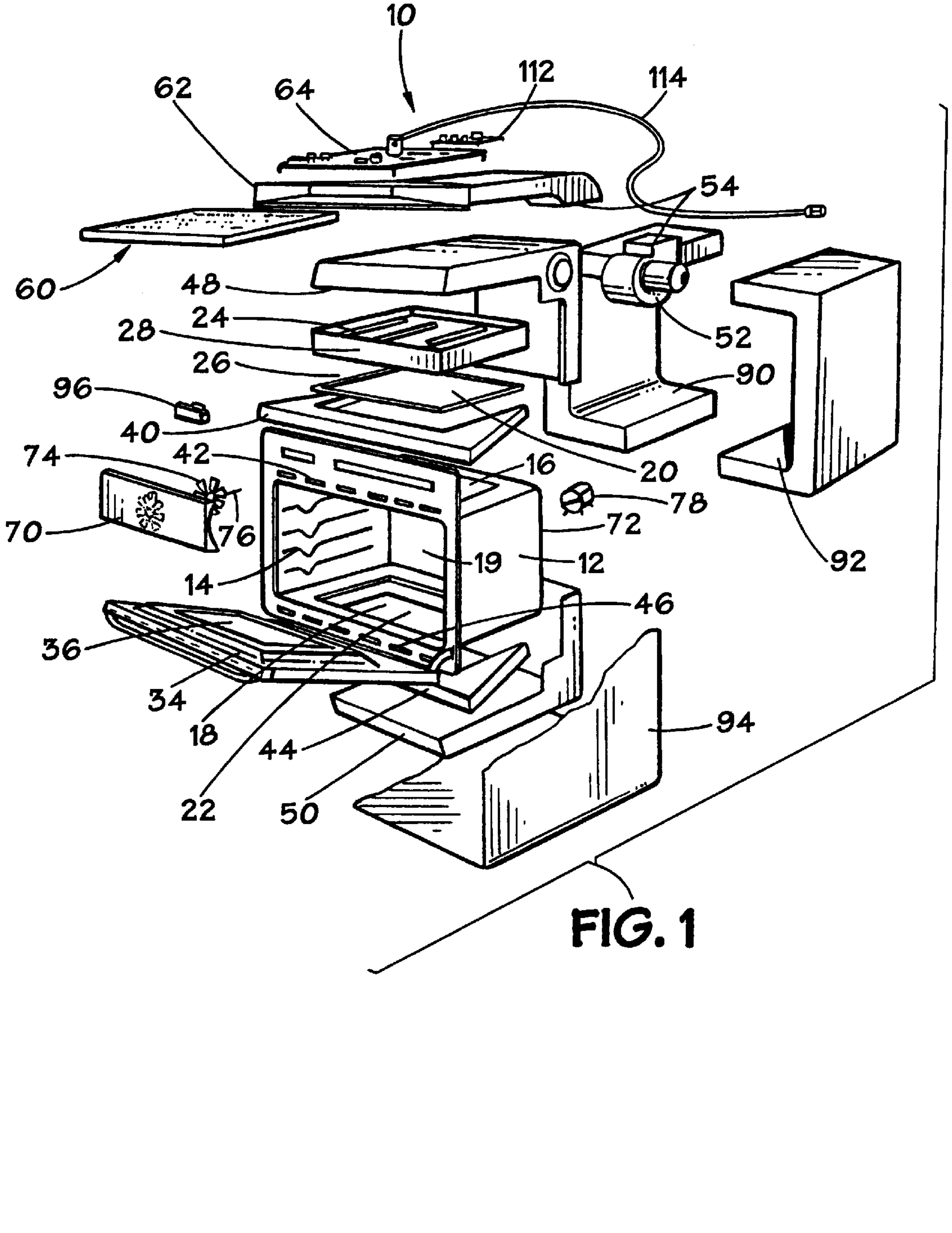
FIG. 1 is an assembly view of an oven according to the present invention.
Figure 2:
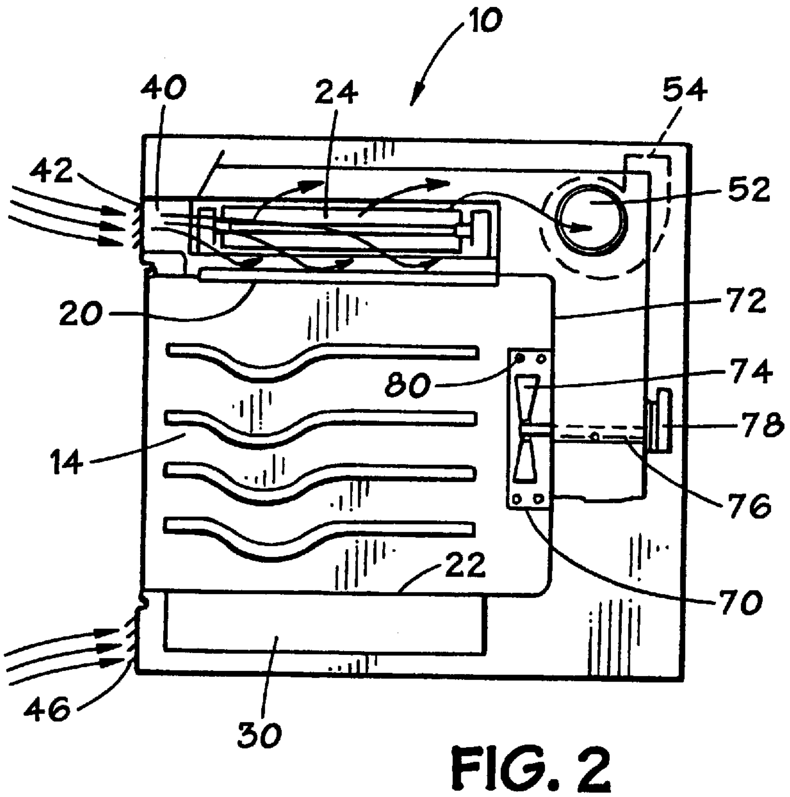
FIG. 2 is a side view of the interior of the oven shown in FIG. 1.
Figure 3:
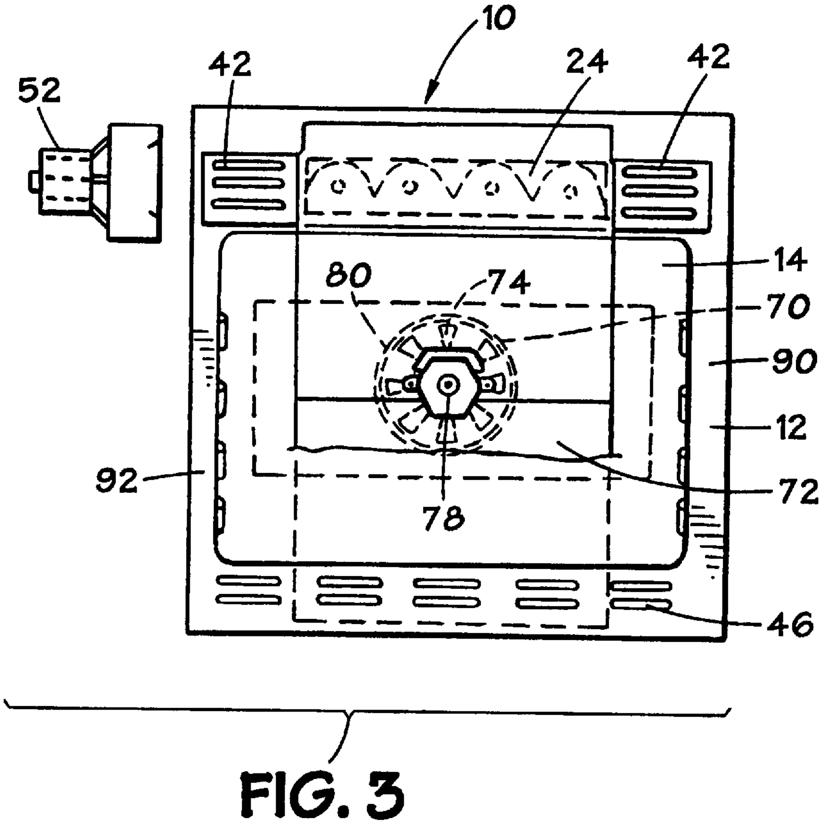
FIG. 3 is a rear view of the interior of the oven shown in FIG. 1.

An oven 10 according to the present invention is illustrated in FIGS. 1, 2, and 3. The oven 10 includes an inner enclosure 12 which defines a cooking chamber 14. The inner enclosure 12 has an upper opening 16, a lower opening 18, and a front opening 19. An upper shield 20 covers the upper opening 16, and a lower shield 22 covers the lower opening 18. An upper lamp cartridge assembly 24, which may be similar to the lamp assembly shown in U.S. Pat. No. 5,721,805, is mounted above the upper shield 20 so that there is an air gap 26 between the upper shield 20 and a lower rim of a front face 28 of the upper lamp cartridge assembly 24.

As disclosed in this patent, the upper lamp cartridge assembly 24 contains low mass, high power density heating lamps such as quartz halogen lamps. These lamps typically have low mass filaments which operate at temperatures in excess of 2,000 K and often operate at temperatures in the range of 2,800 K to 3,000 K. Because of the low mass of the filaments of such heating lamps and the high operating temperatures, these heating lamps emit high power density radiation immediately upon energization in order to provide very rapid heating to a cooking plane of the cooking chamber 14.

An exemplary arrangement of the upper lamp cartridge assembly 24 comprising four perimeter lamps, four diagonal lamps, and reflectors accordingly to the aforementioned patent directs the electromagnetic radiation emitted by the lamps to cover an area of approximately fourteen inches by fourteen inches at a distance of about six inches below the upper shield 20. The power density provided by these lamps may be on the order of 20 watts/in$^2$ (±10%).

A lower lamp cartridge assembly 30 is mounted below the lower shield 22. This lower lamp cartridge assembly 30 may be similar to the upper lamp cartridge assembly 24, or may contain a different number of lamps all arranged in parallel or otherwise with respect to one another. Other arrangements of heating elements may be provided for the upper and lower lamp cartridge assemblies 24 and 30.

The upper and lower shields 20 and 22 may be clear ceramic glass (such as Robax™) that is transparent to the visible and infrared radiation emitted by the heating lamps of the upper and lower lamp cartridge assemblies 24 and 30 but that suppresses ultraviolet radiation. Preferably, this ceramic glass should be selected to withstand self-cleaning temperatures in excess of 850° F. for in excess of three hours. The upper and lower shields 20 and 22 isolate the upper and lower lamp cartridge assemblies 24 and 30 from the cooking environment of the cooking chamber 14.

The oven 10 includes a door 34 which has a window 36 so that the food being cooked in the cooking chamber 14 can be viewed from outside of the oven when the door 34 is closed covering the front opening 19. The window 36 may be a tempered glass window having a reflective thin film coating. This reflective thin film coating may be a nickel chrome coating and is preferably provided on one side of the window 36 in a thickness to limit visible transmission through the window 36 to the range of 2–6% of the total visible light within the cooking chamber 14 of the oven 10.

Accordingly, this reflective thin film coating protects the user of the oven 10 from the intense visible light that may be emitted by the upper and lower lamp cartridge assemblies 24 and 30 when they are energized. It should be noted that the reflective thin film coating also reflects infrared energy from the upper and lower lamp cartridge assemblies 24 and 30 back into the cooking chamber 14.

The window 36, for example, may be typical of windows used in self-cleaning ovens (except for the coating described above). That is, the window 36 may have three panels, an exterior panel of tempered float glass, a middle panel of tempered float glass, and an interior panel (closest to the cooking chamber 14) of tempered high temperature borosilicate glass. The reflective thin film coating may be provided on the surface of the interior panel facing the middle panel.

An upper air intake 40 is mounted above the upper shield 20. The upper air intake 40 cooperates with the air gap 26 between the upper lamp cartridge assembly 24 and the upper shield 20 and with corresponding vents 42 in an upper front flange of the inner enclosure 12 so that cooling air is drawn into the oven 10 from ambient and is directed by the upper air intake 40 through the air gap 26 into the upper lamp cartridge assembly 24. Accordingly, the upper lamp cartridge assembly 24 is cooled. Similarly, a lower air intake 44 cooperates with vents 46 in a lower front flange of the inner enclosure 12 so that cooling air is drawn into the oven 10 from ambient and is directed by the lower air intake 44 into the lower lamp cartridge assembly 30.

An upper plenum 48 cooperates with the upper lamp cartridge assembly 24 in order to guide the upper cooling air through the upper lamp cartridge assembly 24. A lower plenum 50 cooperates with the lower lamp cartridge assembly 30 in order to guide the lower cooling air through the lower lamp cartridge assembly 30.

A blower 52 is mounted through the upper plenum 48 and, when energized, causes air to be drawn through the vents 42 and 46 and through the air gap 26 between the upper lamp cartridge assembly 24 and the upper shield 20 and to be directed by the upper and lower air intakes 40 and 44 into the upper and lower lamp cartridge assemblies 24 and 30, and then out through an exhaust port 54 shown in FIGS. 1 and 2. The blower 52 may be a centrifugal blower, a transverse blower, or any other suitable blower.

Mounted to the top of the upper plenum 48 is a component insulation 60, mounted on top of the component insulation 60 is a hot air exhaust plenum 62, and mounted on top of the hot air exhaust plenum 62 is a processor board 64. The hot air exhaust plenum 62 cooperates with the exhaust port 54 so that the air drawn through the upper and lower lamp cartridge assemblies 24 and 30 by the blower 52 is exhausted through the exhaust port 54 and through the hot air exhaust plenum 62 to the room environment outside of the oven 10. If desired, the air that is heated by the heating lamps of the upper and lower lamp cartridge assemblies 24 and 30 and that is supplied to the hot air exhaust plenum 62 may be diluted with ambient air in order to provide additional cooling to the air that is exhausted into the room environment. This air in the hot air exhaust plenum 62 vents to ambient through the front cavity face above the cooking chamber 14.

A convection fan box 70 is mounted within the cooking chamber 14 to a rear wall 72 of the inner enclosure 12. The convection fan box 70 has openings therethrough and houses a convection fan blade 74 that is attached by a rotor 76 to a convection fan motor 78 mounted to an exterior side of the rear wall 72. The convection fan motor 78, for example, may be an axial convection fan motor. When the convection fan motor 78 is energized during convection heating, the convection fan motor 78 causes the convection fan blade 74 to rotate thereby circulating air through the openings of the convection fan box 70 and throughout the cooking chamber 14. A convection heater 80 (see FIGS. 2 and 3) is provided within the convection fan box 70 and is energized during convection heating in order to heat the air within the cooking chamber 14 that is circulated by the rotating convection fan blade 74. The convection heater 80 may be an electric resistance coil and is mounted around the convection fan blade 74, although the convection heater 80 may have any shape and may be mounted at any desired location within the oven 10. The convection heater 80, for example, may be a calrod.

Insulation 90 and insulation 92 are provided on corresponding sides of the oven 10 between the inner enclosure 12 and an outer enclosure 94. The outer enclosure 94 houses the components of the oven 10 as shown in FIG. 1. A display module 96 is supported by the upper flange of the inner enclosure 12 in order to provide various indications to the user.

The upper and lower lamp cartridge assemblies 24 and 30 are controlled by a controller 110 (described below in connection with FIGS. 4 and 5) so that the heating elements of the upper and lower lamp cartridge assemblies 24 and 30 may be operated individually or in groups and so that the upper and lower lamp cartridge assemblies 24 and 30 may be operated independently of one another and independently of, or in conjunction with, the convection heater 80 and the convection fan 74/78 in order to optimize cooking speed and quality.

During convection heating, the convection heater 80 and the convection fan motor 78 are energized. The convection heater 80 heats the air within the cooking chamber 14, and the convection fan blade 74 is driven by the convection fan motor 78 in order to circulate the heated air through the cooking chamber 14. Because electric resistance heaters are high mass heating elements that heat up slowly when first energized, one or more of the heating lamps of the upper and lower lamp cartridge assemblies 24 and 30 may also be energized during at least initial convection heating in order to start the oven cavity thermalizing process. In this way, convection cooking is accelerated. Moreover, the heating lamps of the upper and lower lamp cartridge assemblies 24 and 30 may be energized at any time during convection heating in order to provide supplemental heat for higher temperature convection cooking requirements.

Furthermore, during non-convection heating when the convection heater 80 and the convection fan motor 78 are not energized, one of more of the heating lamps of the upper and lower lamp cartridge assemblies 24 and 30 may be energized in order to provide high power density cooking energy to the cooking chamber 14. In this way, food in the cooking chamber 14 may be rapidly cooked, browned, and otherwise processed.

Figure 4:
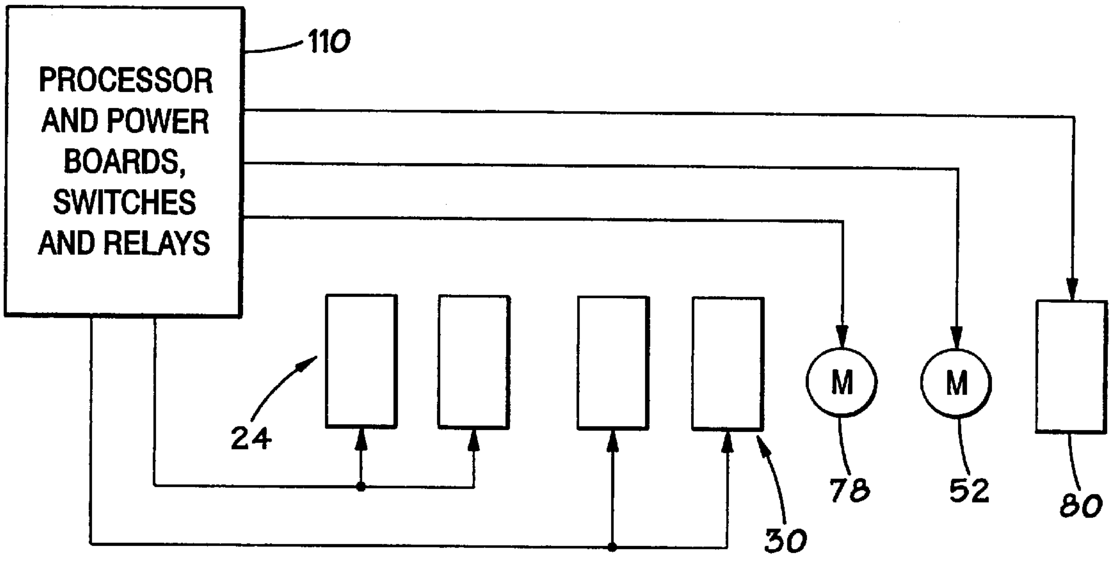
FIG. 4 shows a controller that may be used in the oven of FIGS. 1, 2, and 3; and, FIG. 5 is a flow chart of a program that may be executed by the controller of FIG. 4.

As shown in FIG. 4, the controller 110, for example, may include the processor board 64 and a power supply board 112, as well as suitable switches (such as triacs) and/or relays. A power cord 114 is provided to supply power to the controller 110. The switches and/or relays may be arranged to respond to the processor board in order to control the supply of power from the power board to the heating elements of the upper and lower lamp cartridge assemblies 24 and 30, the convection fan motor 78, the blower 52, and the convection heater 80. The processor board of the controller 110 may include a microprocessor or other processing element running software that provides the control functions of the oven 10. Also, the processor board of the controller 110 may be interfaced with the display module 96 and user actuated switches of the oven 10. The display module 96 displays various functions of the oven 10 such as time, temperature, power settings, program information, and the like. The user actuated switches may include pre-set cooking keypads and function keypads. The pre-set cooking keypads may be used by the user to select pre-programmed cooking schedules, and the function keypads may be used by the user to alter pre-programmed cooking sequences, to select time and power settings, and the like. In addition, the controller 110 may include an oven temperature sensor interfaced with the processor for sensing the temperature of the cooking chamber 14 during cooking and self-cleaning schedules, and a thermal cutoff switch arranged to cut power to the elements of the oven 10 in response to an over temperature condition. A light in the cooking chamber 14 may be controlled by a door switch as is known.

The controller 110 may include other control elements such as line voltage, line current, and line frequency sensors which may be used to adjust cooking schedules as line voltage, current, and frequency fluctuate. A watch-dog timer may be included in order to prevent the controller 110 from activating the heating elements of the upper and lower lamp cartridge assemblies 24 and 30, the convection fan motor 78, the blower 52, and the convection heater 80 in the event that the controller 110 stops operating properly. Also, a speaker may be included in order to provide audible feedback to the user.

Figure 5:
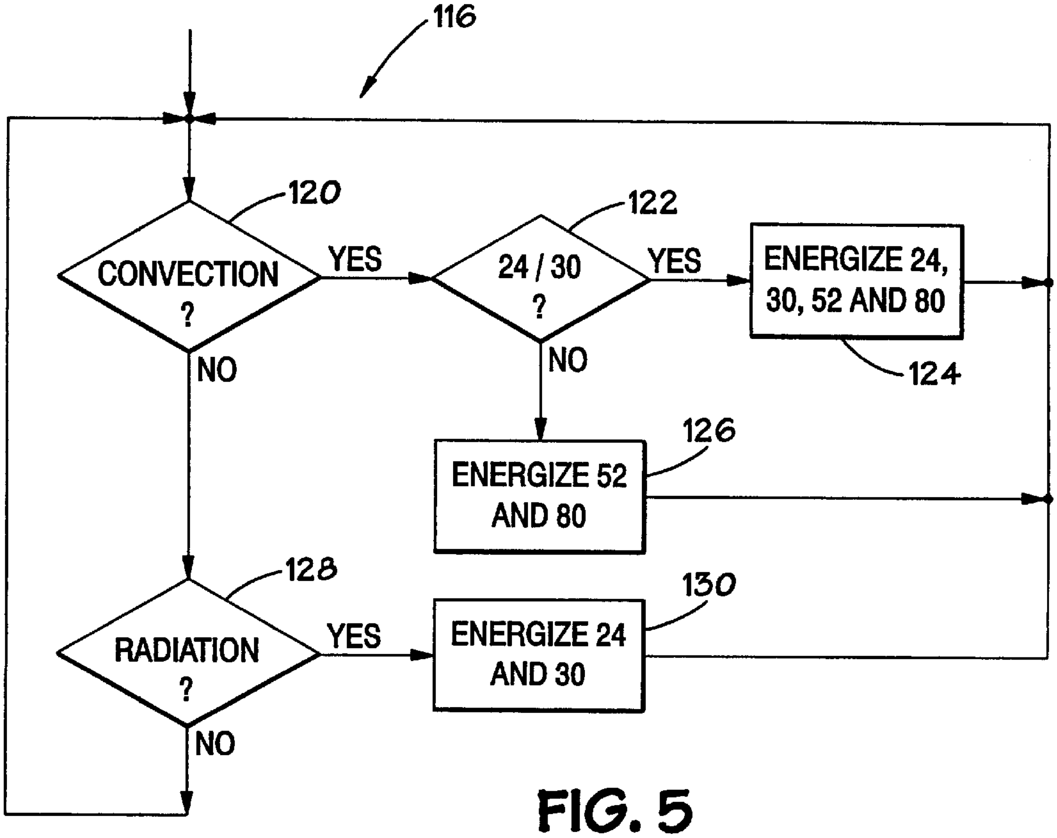

The controller 110 controls the heating elements of the upper and lower lamp cartridge assemblies 24 and 30, the convection fan motor 78, the blower 52, and the convection heater 80 by executing a main control program 116 shown in FIG. 5.

When the main control program 116 is entered, such as when a pre-programmed cooking schedule is selected by the user of the oven 10, a block 120 of the main control program 116 determines whether convection heating is included at start up of the cooking schedule selected by the user. If convection heating is included in the selected cooking schedule at start up, a block 122 determines whether the selected cooking schedule requires energization of one or more heating elements of the upper and lower lamp cartridge assemblies 24 and 30 at start up. If so, those heating elements of the upper and lower lamp cartridge assemblies 24 and 30, the convection fan motor 78, and the convection heater 80 are energized at a block 124. If the selected cooking schedule does not require energization of any of the heating elements of the upper and lower lamp cartridge assemblies 24 and 30 at start up, only the convection fan motor 78 and the convection heater 80 are energized at a block 126.

If convection heating is not included at start up of the selected cooking schedule as determined at the block 120, a block 128 of the main control program 116 determines whether radiation heating is included at start up of the selected cooking schedule. If radiation heating is included at start up of the selected cooking schedule, selected heating elements of the upper and lower lamp cartridge assemblies 24 and 30 are energized at a block 130 depending upon the particular selected cooking schedule. After ones of the upper and lower lamp cartridge assemblies 24 and 30, the convection fan motor 18, and the convection heater 80 are energized at a block 124, or after only the convection fan motor 78 and the convection heater 80 are energized at a block 126, or after selected heating elements of the upper and lower lamp cartridge assemblies 24 and 30 are energized at a block 130, or if radiation heating is not included at start up of the selected cooking schedule as determined at the block 128, the main control program 116 is periodically re-entered in order to determine whether the selected cooking schedule, or the user, requires energization of the same or different heating components according to the tests performed by the blocks 120, 122, and 128.

Throughout operation of the oven 10 according to the selected cooking schedule, the blower 52 is energized either continuously or under thermostatic control.

Upon initial start-up of the heating elements of the upper and lower lamp cartridge assemblies 24 and 30, the controller 110 may implement phase-firing in order to reduce large in-rush currents. Also, in the case where the heating elements are lamps, phase-firing reduces mechanical filament fatigue associated with cold lamps. Accordingly, during initial start-up, only small sections of the AC line voltage are applied to the heating elements and the heating elements are gradually brought up to full intensity. This operation is known as soft-start during which electromagnetic interference (EMI) may be generated. Therefore, it may be desirable to include suitable filters to suppress this electro-magnetic interference. Once the heating elements are hot, they may be phase-fired to achieve the power setting selected by the user.

The oven 10 requires little or no oven pre-heat, provides rapid thermalizing, and browns a wide variety of foods. The lower lamp cartridge assembly 30 may be controlled in order to heat a grill or pan. Indeed, a grill, such as that disclosed in U.S. patent application Ser. No. 08/994,922 filed on Dec. 19, 1997, may be used to facilitate broiling by placing it at the cooking plane in the cooking chamber 14. Accordingly, the grill is heated by the lower lamp cartridge assembly 30 while the upper lamp cartridge assembly 24 impinges the food on the grill with high power radiation.

The interior walls of the cooking chamber 14 may be provided with multiple rack supports in order to support a rack at multiple elevations within the cooking chamber 14 or in order to support multiple racks. When using one or more racks simultaneously in the cooking chamber 14 during cooking, the convection fan motor 78 and the convection heater 80 can be used alone, or the convection fan motor 78 and the convection heater 80 can be used in conjunction with the upper and lower lamp cartridge assemblies 24 and 30 in order to accelerate cooking.

Certain modifications of the present invention have been discussed above. Other modifications will occur to those practicing in the art of the present invention. For example, an oven according to the present invention may have any number of heating lamps above and below the cooking plane, and may have only one or more lamps above the cooking plane or only one or more lamps below the cooking plane.

Moreover, other low mass, substantially instant-on heating elements may be used in place of heating lamps.

Furthermore, as described above, the hot air exhaust plenum 62 and the exhaust port 54 cooperate so that the air drawn into the oven 10 by the blower 52 is exhausted from the oven 10 through the exhaust port 54 and through the hot air exhaust plenum 62 to the front exterior of the oven 10. However, the cooling air heated by the heating lamps of the upper and lower lamp cartridge assemblies 24 and 30 instead may be vented through the exhaust port 54 and a corresponding four inch or six inch duct to the outdoor environment.

Also, the convection fan motor 78 may be any other type of motor suitable for rotating the convection fan blade 74.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An oven comprising:

a cooking chamber;

a radiation heating source including a low mass, high power density heating element arranged to provide substantially immediate high power density rapid heating in the cooking chamber;

a convection heating source arranged to provide convection heating in the cooking chamber, wherein the convection heating source includes a convection fan arranged to move air through the cooking chamber during convection heating;

a cooling fan arranged to cool the radiation heating source, and a door allowing access to the cooking chamber and including a tempered transparent window having a reflective thin film arranged to protect a user of the oven from intense visible light when the radiation heating source is energized, wherein the window has an inner and an outer side, with the thin film on one side of the window to limit visible transmission of light through the window to the range of 2%–6% of total visible light within the cooking chamber.

2. The oven of claim 1 further comprising a heating element air intake arranged to direct cooling air moved by the cooling fan through radiation heating source.

3. The oven of claim 1 wherein the low mass, high power density heating element comprises a heating lamp having a low mass filament, and wherein the heating lamp is arranged to provide high power density to the cooking chamber.

4. The oven of claim 1 wherein the radiation heating source comprises first and second groups of heating lamps having low mass filaments, wherein the heating lamps are arranged to provide high power density to the cooking chamber, wherein the first group of heating lamps is mounted above a cooking plane within the cooking chamber, and wherein the second group of heating lamps is mounted below the cooking plane.

5. The oven of claim 4 further comprising upper and lower air intakes, wherein the upper air intake is arranged to direct cooling air moved by the cooling fan through the first group of heating lamps, and wherein the lower air intake is arranged to direct cooling air moved by the cooling fan through the second group of heating lamps.

6. The oven of claim 5 further comprising:

a first substantially transparent shield arranged to shield the first group of heating lamps from the cooking chamber; and, a second substantially transparent shield arranged to shield the second group of heating lamps from the cooking chamber.

7. The oven of claim 1 wherein the convection heating source further comprises a resistance heater arranged to heat the air circulated through the cooking chamber by the convection fan during convection heating.

8. The oven of claim 7 further comprising a heating element air intake arranged to direct cooling air moved by the cooling fan through the radiation heating source.

9. The oven of claim 7 wherein the low mass, high power density heating element comprises a heating lamp having a low mass filament and is arranged to provide high power density to the cooking chamber.

10. The oven of claim 7 wherein the radiative heating source comprises first and second groups of heating lamps having low mass filaments, wherein the heating lamps are arranged to provide high power density to the cooking chamber, wherein the first group of heating lamps is mounted above a cooking plane within the cooking chamber, and wherein the second group of heating lamps is mounted below the cooking plane.

11. The oven of claim 10 further comprising upper and lower air intakes, wherein the upper air intake is arranged to direct cooling air moved by the cooling fan through the first group of heating lamps, and wherein the lower air intake is arranged to direct cooling air moved by the cooling fan through the second group of heating lamps.

12. The oven of claim 1 further comprising:

a first substantially transparent shield arranged to shield the first group of heating lamps from the cooking chamber; and, a second substantially transparent shield arranged to shield the second group of heating lamps from the cooking chamber.

13. The oven of claim 12 further comprising a door having a reflective thin film arranged to protect a user from intense visible light when at least one of the heating lamps of the first and second groups of heating lamps is energized.

14. An oven, comprising:

a cooking chamber including a door allowing access to the cooking chamber, the door including a tempered transparent window having a reflective thin film to limit visible transmission of light through the window to the range of 2%–6% of total visible light within the cooking chamber;

at least one radiant heating element arranged to provide substantially immediate radiation heating to the cooking chamber;

at least one convective heating element arranged to provide convective heat to the cooking chamber;

a convection fan disposed in the cooking chamber to circulate air in the cooking chamber;

an upper plenum having a blower, and adapted to guide cooling air around the at least one radiant heating element; and a controller having a processor board which includes a microprocessor running software that enables control of the at least one heating element, the convection fan, the blower and the at least one convection heating element.

15. The oven of claim 14 wherein the controller controls the at least one heating element, the convection fan, the blower and the at least one convection heater by executing a main control program.

16. The oven of claim 14 wherein the controller has a processor board interfaced with a display module comprising user activated switches.

17. The oven of claim 16 wherein the display module displays oven functions for cooking time.

18. The oven of claim 16 wherein the display module displays oven functions for cooking temperature.

19. The oven of claim 16 wherein the display module displays oven functions for power settings.

20. The oven of claim 16 wherein the display module displays oven functions for program information.

21. The oven of claim 16 wherein the user activated switches include pre-set cooking key pads for a variety of foods.

22. The oven of claim 16 wherein the pre-set cooking key pads activate a pre-programmed cooking schedule.

23. The oven of claim 16 wherein the pre-set cooking key pads activate a pre-programmed oven cleaning schedule.

24. The oven of claim 16 wherein the controller receives input temperature data from an oven temperature sensor interfaced with the microprocessor to assure consistent quality of a cooked product.

25. The oven of claim 14 further comprising: at least one substantially transparent shield is arranged to shield the at least one radiant heating element from the heat in the cooking chamber.

26. The oven of claim 14 wherein the radiant heating element is a quartz halogen lamp.

27. The oven of claim 14 wherein the convective heating element is an electric resistance coil mounted around the convection fan.

28. The oven of claim 14 wherein the convective heating element is a calrod.

29. The oven of claim 14 wherein a plurality of heating elements are arranged in an upper group configured above a food, and a lower group configured below the food.

30. The oven of claim 29 wherein the upper group of heating elements further comprises:

a plurality of perimeter quartz halogen lamps having reflectors; and a plurality of diagonal quartz halogen lamps having reflectors, wherein the lamps and reflectors generate electromagnetic radiation at power density of up to 20 watts per square inch of food surface area.

* * * * *